US012000242B2

United States Patent
Minassa et al.

(10) Patent No.: US 12,000,242 B2
(45) Date of Patent: Jun. 4, 2024

(54) LOW POWER CONSUMPTION ELECTRO-HYDRAULIC VALVE CONTROLLER

(71) Applicant: Halliburton Energy Services, Inc., Houston, TX (US)

(72) Inventors: Lorenzzo Breda Minassa, Tomball, TX (US); Robert William Gissler, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 228 days.

(21) Appl. No.: 17/645,274

(22) Filed: Dec. 20, 2021

(65) Prior Publication Data

US 2022/0235630 A1 Jul. 28, 2022

Related U.S. Application Data

(60) Provisional application No. 63/141,615, filed on Jan. 26, 2021, provisional application No. 63/141,624, (Continued)

(51) Int. Cl.
*E21B 34/06* (2006.01)
*E21B 23/04* (2006.01)
(Continued)

(52) U.S. Cl.
CPC ............ *E21B 34/066* (2013.01); *E21B 23/04* (2013.01); *E21B 33/0355* (2013.01);
(Continued)

(58) Field of Classification Search
CPC ........ E21B 34/066; E21B 34/10; E21B 34/14; E21B 34/16; E21B 23/04; E21B 33/0355;
(Continued)

(56) References Cited

U.S. PATENT DOCUMENTS

| 1,372,502 A | 3/1921 | Willibald |
| 4,579,177 A | 4/1986 | Going, III |

(Continued)

FOREIGN PATENT DOCUMENTS

| CA | 1276874 C | 11/1990 |
| CN | 106593301 A | 4/2017 |

(Continued)

OTHER PUBLICATIONS

"Different Types of 3-Way Valves", Solenoid Solutions Inc., https://www.solenoidsolutionsinc.com/infographics/different_types-of-3-way-valves/, (n.d.), 5 pages.

(Continued)

*Primary Examiner* — Craig M Schneider
*Assistant Examiner* — Andrew J Rost
(74) *Attorney, Agent, or Firm* — DeLizio, Peacock, Lewin & Guerra, LLP

(57) ABSTRACT

An electro-hydraulic control system for actuating a control valve includes a control module. The control module is coupled to the surface via two hydraulic lines and an electric line. The control module uses one of the hydraulic lines as an "open" line and the other line as a "close" line. The control module includes a normally closed (NC) solenoid valve (SOV) that is coupled to the electric line and can be controlled from the surface to open or close. The opening or closing of the NC SOV in cooperation with hydraulic pressure on an "open" or "close" line of the hydraulic lines operates (i.e., closes or opens) the control valve.

20 Claims, 4 Drawing Sheets

Related U.S. Application Data filed on Jan. 26, 2021, provisional application No. 63/141,635, filed on Jan. 26, 2021, provisional application No. 63/141,618, filed on Jan. 26, 2021, provisional application No. 63/141,630, filed on Jan. 26, 2021.

(51) Int. Cl.

| | | |
|---|---|---|
| *E21B 33/035* | (2006.01) | |
| *E21B 34/10* | (2006.01) | |
| *E21B 34/14* | (2006.01) | |
| *F16K 31/40* | (2006.01) | |
| *G05D 16/20* | (2006.01) | |
| *E21B 34/16* | (2006.01) | |

(52) U.S. Cl.
CPC ............. *E21B 34/10* (2013.01); *E21B 34/14* (2013.01); *F16K 31/40* (2013.01); *G05D 16/2022* (2019.01); *G05D 16/204* (2013.01); *E21B 34/16* (2013.01); *E21B 2200/02* (2020.05)

(58) Field of Classification Search
CPC ...... E21B 33/05; E21B 2200/02; F16K 31/40; G05D 16/2022; G05D 16/204
See application file for complete search history.

(56) References Cited

U.S. PATENT DOCUMENTS

| | | | |
|---|---|---|---|
| 4,736,791 | A | 4/1988 | Rorden |
| 4,798,247 | A | 1/1989 | Deaton et al. |
| 4,942,926 | A | 7/1990 | Lessi |
| 4,945,995 | A | 8/1990 | Tholance et al. |
| 5,050,681 | A | 9/1991 | Skinner |
| 5,065,825 | A | 11/1991 | Bardin et al. |
| 6,053,202 | A | 4/2000 | Cunningham |
| 6,179,052 | B1 | 1/2001 | Purkis et al. |
| 6,470,970 | B1 | 10/2002 | Purkis et al. |
| 6,715,558 | B2 | 4/2004 | Williamson |
| 7,219,591 | B2 | 5/2007 | Loedige et al. |
| 10,605,048 | B2 | 3/2020 | Macgregor et al. |
| 10,745,998 | B2 | 8/2020 | Prost et al. |
| 11,274,526 | B2 | 3/2022 | Deville et al. |
| 11,435,765 | B2 | 9/2022 | Patz et al. |
| 11,536,112 | B2 | 12/2022 | Clayton et al. |
| 11,591,884 | B2 | 2/2023 | Clayton et al. |
| 2001/0037884 | A1 | 11/2001 | Schultz et al. |
| 2002/0007946 | A1 | 1/2002 | Purkis et al. |
| 2006/0168955 | A1 | 8/2006 | Longfield et al. |
| 2006/0201321 | A1 | 9/2006 | Loedige et al. |
| 2006/0254763 | A1 | 11/2006 | Tips et al. |
| 2007/0163774 | A1 | 7/2007 | Hosatte et al. |
| 2009/0283276 | A1 | 11/2009 | Mandrou et al. |
| 2010/0059233 | A1 | 3/2010 | Smithson et al. |
| 2010/0084588 | A1 | 4/2010 | Curtiss, III et al. |
| 2010/0236790 | A1 | 9/2010 | Smithson |
| 2011/0098946 | A1 | 4/2011 | Curtiss, III |
| 2012/0067593 | A1 | 3/2012 | Powell et al. |
| 2012/0073670 | A1 | 3/2012 | Lymberopoulos |
| 2015/0308212 | A1 | 10/2015 | Maunus et al. |
| 2017/0022790 | A1 | 1/2017 | Leitch |
| 2018/0051536 | A1 | 2/2018 | Macgregor et al. |
| 2018/0119522 | A1* | 5/2018 | Prost ........................ E21B 23/04 |
| 2019/0055812 | A1 | 2/2019 | Halily et al. |
| 2019/0316433 | A1 | 10/2019 | Schroit et al. |
| 2020/0190943 | A1 | 6/2020 | Clayton et al. |
| 2020/0217157 | A1 | 7/2020 | Oser et al. |
| 2020/0248533 | A1 | 8/2020 | Clayton et al. |
| 2021/0102440 | A1 | 4/2021 | Minassa et al. |
| 2021/0190099 | A1 | 6/2021 | Orth et al. |
| 2021/0254431 | A1 | 8/2021 | Prost |
| 2022/0017051 | A1 | 1/2022 | Kim |

FOREIGN PATENT DOCUMENTS

| | | |
|---|---|---|
| EP | 2324192 B1 | 5/2018 |
| GB | 2297568 | 8/1996 |
| GB | 2615451 | 8/2023 |
| GB | 2615452 | 8/2023 |
| WO | 9747852 | 12/1997 |
| WO | 2006124024 | 11/2006 |
| WO | 2010042298 | 4/2010 |
| WO | 2019226160 | 11/2019 |
| WO | 2019246501 A1 | 12/2019 |
| WO | 2022164551 | 8/2022 |
| WO | 2022164592 | 8/2022 |
| WO | 2022164593 | 8/2022 |
| WO | 2022164594 | 8/2022 |
| WO | 2022164595 | 8/2022 |

OTHER PUBLICATIONS

"How A 2-Way Normally Closed Solenoid Valve Works", Solenoid Solutions Inc., https://www.solenoidsolutionsinc.com/infographics/how-a-2-way-normally-closed-solenoid-valve-works/, (n.d.), 5 pages.
"HS Interval Control Valves", Halliburton, 2017, 2 pages.
"Intelligent Completions: SmartWell Completion Systems", Halliburton, 2013, 8 pages.
"Lee FLOSERT® Miniature Flow Regulating Valves", https://news.thomasnet.com/companystory/lee-flosert-miniature-low-regulating-valves-40006265, (n.d.), 6 pages.
"More on Lee Flow Controls", The Lee Company, https://www.theleeco.com/products/precision-microhydraulics/flow-control-valves/more-on-lee-flow-controls/, (n.d.), 3 pages.
"Product Details: Piloting Solenoid Valve SDBB2131002A", The Lee Company, http://leecat.theleeco.com/ecatalog/piloting-solenoid-valves/en/SDBB2131002A, 2011, 2 pages.
"SmartPlex® Downhole Control System", Halliburton, 2015, 2 pages.
"Solenoid Valves", The Lee Company, https://www.theleeco.com/products/precision-microhydraulics/solenoid-valves/, (n.d.), 4 pages.
"Technical Hydraulic Handbook (12th ed.)", The Lee Company, 2018, 819 pages.
"U.S. Appl. No. 17/645, 196, Restriction Requirement", dated Mar. 22, 2023, 7 pages.
"U.S. Appl. No. 17/645,259, Ex Parte Quayle", Mar. 2, 2023, 7 pages.
"U.S. Appl. No. 17/645,289, Restriction Requirement", dated Apr. 20, 2023, 7 pages.
"U.S. Appl. No. 17/645,224, Ex Parte Quayle", Aug. 31, 2023, 7 pages.
"PCT Application No. PCT/US2021/064576, International Search Report and Written Opinion", dated May 31, 2022, 9 pages.
"PCT Application No. PCT/US2021/073048, International Search Report and Written Opinion", dated Apr. 19, 2022, 11 pages.
"PCT Application No. PCT/US2021/073049, International Search Report and Written Opinion", dated Apr. 19, 2022, 10 pages.
"PCT Application No. PCT/US2021/073051, International Search Report and Written Opinion", dated Apr. 18, 2022, 10 pages.
"PCT Application No. PCT/US2021/073054, International Search Report and Written Opinion", dated Apr. 15, 2022, 10 pages.

* cited by examiner

LOW POWER CONSUMPTION ELECTRO-HYDRAULIC VALVE CONTROLLER

TECHNICAL FIELD

The disclosure generally relates to the field of obtaining hydrocarbons (e.g., as oil or gas) from wells and, more specifically, to methods and equipment for completion of wellbores and control and improvement of production.

BACKGROUND

Various tools and tool systems have been developed to control, select, and/or regulate the production of hydrocarbon fluids and other fluids produced downhole from subterranean wells. Downhole well tools such as sliding sleeves, sliding windows, interval control valves, safety valves, lubricator valves, and gas lift valves are representative examples of control tools positioned downhole in wells.

Sliding sleeves and similar devices can be placed in isolated sections of the wellbore to control fluid flow from such wellbore sections. Multiple sliding sleeves and at least one interval control valve (ICV) can be placed in different isolated sections within tubing to jointly control fluid flow within the particular tubing section, and to commingle the various fluids within a common tubing interior.

BRIEF DESCRIPTION OF THE DRAWINGS

Embodiments of the disclosure may be better understood by referencing the accompanying drawings.

DESCRIPTION OF EMBODIMENTS

The description that follows includes example systems and methods that embody examples of the disclosure. However, it is understood that this disclosure may be practiced without these specific details. For instance, this disclosure refers to hydraulic circuits for controlling an interval control valve (ICV) in a completion system in illustrative examples. Embodiments of this disclosure can be also applied to controlling other downhole valves or instruments and can be implemented in any system combining hydraulic power and electric power. In other instances, well-known instruction instances, protocols, structures, and techniques have not been shown in detail in order not to obfuscate the description.

Systems for controlling multiple downhole tools, particularly ICVs, can include electric and hydraulic lines (electro-hydraulic systems). These systems require substantial power to control the downhole tools. A single solenoid electro-hydraulic control system is disclosed herein that controls downhole tools with low power consumption. The system's power consumption can be low enough to be compatible with disconnect tools using inductive coupling.

In the disclosed electro-hydraulic control system, a controller/control module of an electro-hydraulic system is coupled with an ICV to control the ICV. The control module is coupled to the surface via two hydraulic lines and an electric line. The control module uses one of the hydraulic lines as an "open" line and the other line as a "close" line. The control module includes a normally closed (NC) solenoid valve (SOV) that is coupled to the electric line and can be controlled from the surface to open or close. The opening or closing of the NC SOV in cooperation with hydraulic pressure on an "open" or "close" line of the hydraulic lines operates (i.e., closes or opens) the ICV.

Example Illustrations

Figure 1:
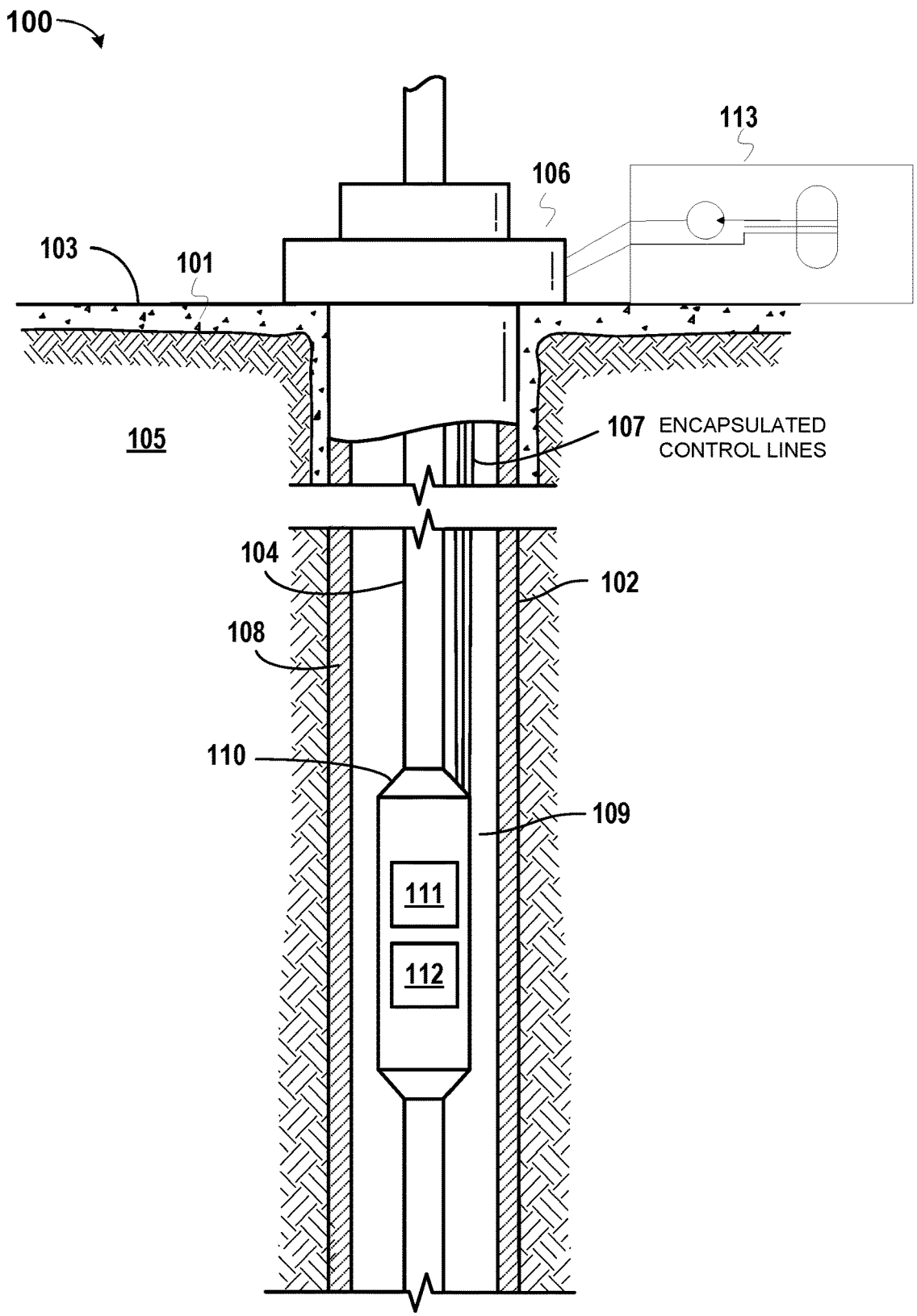
FIG. 1 depicts a partial cross-sectional view of a well completion 100 that includes a low power electro-hydraulic circuit with an NC SOV that controls an ICV 112.

FIG. 1 depicts a partial cross-sectional view of a well completion 100 that includes a low power electro-hydraulic circuit with an NC SOV that controls an ICV 112. The electro-hydraulic circuit includes a hydraulic power system 113, encapsulated control lines 107, and a control module/hydraulic manifold assembly 111. The ICV 112 controlled via the control module 111 can be considered part of the circuit or external to the circuit. The well completion 100 includes a wellbore 102 extending through, i.e., formed in, a subterranean formation 105 from a wellhead 106 located at a surface 103. The wellbore 102 includes a casing string 108. The casing string 108 can be at least partially cemented into the subterranean formation, e.g., via one or one or more layers of cement 101. Although cement 101 is shown near the surface 103, in one or more embodiments cement can extend the length of the wellbore 102. Although the wellbore 102 is depicted as a single vertical wellbore, other implementations are possible. For example, the wellbore 102 can include one or more deviated or horizontal portions. Although only one casing string 108 is shown, multiple casing strings may be radially and/or circumferentially disposed around casing string 108.

A tubing string 104 is positioned in the wellbore 102 inside the casing string 108, forming an annulus 109 between the tubing string 104 and the casing string 108. A completion component or sub-assembly ("sub") 110 is included in (or physically coupled to) the tubing string 104. Both the completion sub 110 and the tubing string 104 collectively (possibly with other completion subs and joined tubing) form the tubing string of the well completion 100.

Encapsulated control lines 107 extend from the surface 103 of the wellbore 102 to the completion sub 110. The control lines 107 at least include an electrical line and multiple hydraulic lines. Hydraulic lines of the control lines 107 are coupled to the hydraulic power system 113 and the control module 111. The hydraulic power system 113 converts mechanical energy into hydraulic energy that is provided to the control module 111 via the hydraulic lines of the control lines 107.

The completion sub 110 includes a control module 111 and the ICV 112. The control module 111 is coupled to the ICV 112 and includes portions of the control lines 107. Although shown as components of the completion sub 110, the control module 111 and/or the ICV 112 can be coupled directly to the tubing string 104 and/or to one another, e.g., via threaded ends.

The ICV 112 controls flow between an interior and exterior of the tubing string 104. For example, the exterior of the ICV 112 can be exposed to the annulus 109 and the ICV 112 can regulate flow between the interior of the tubing string 104 and the annulus 109.

Figure 2:
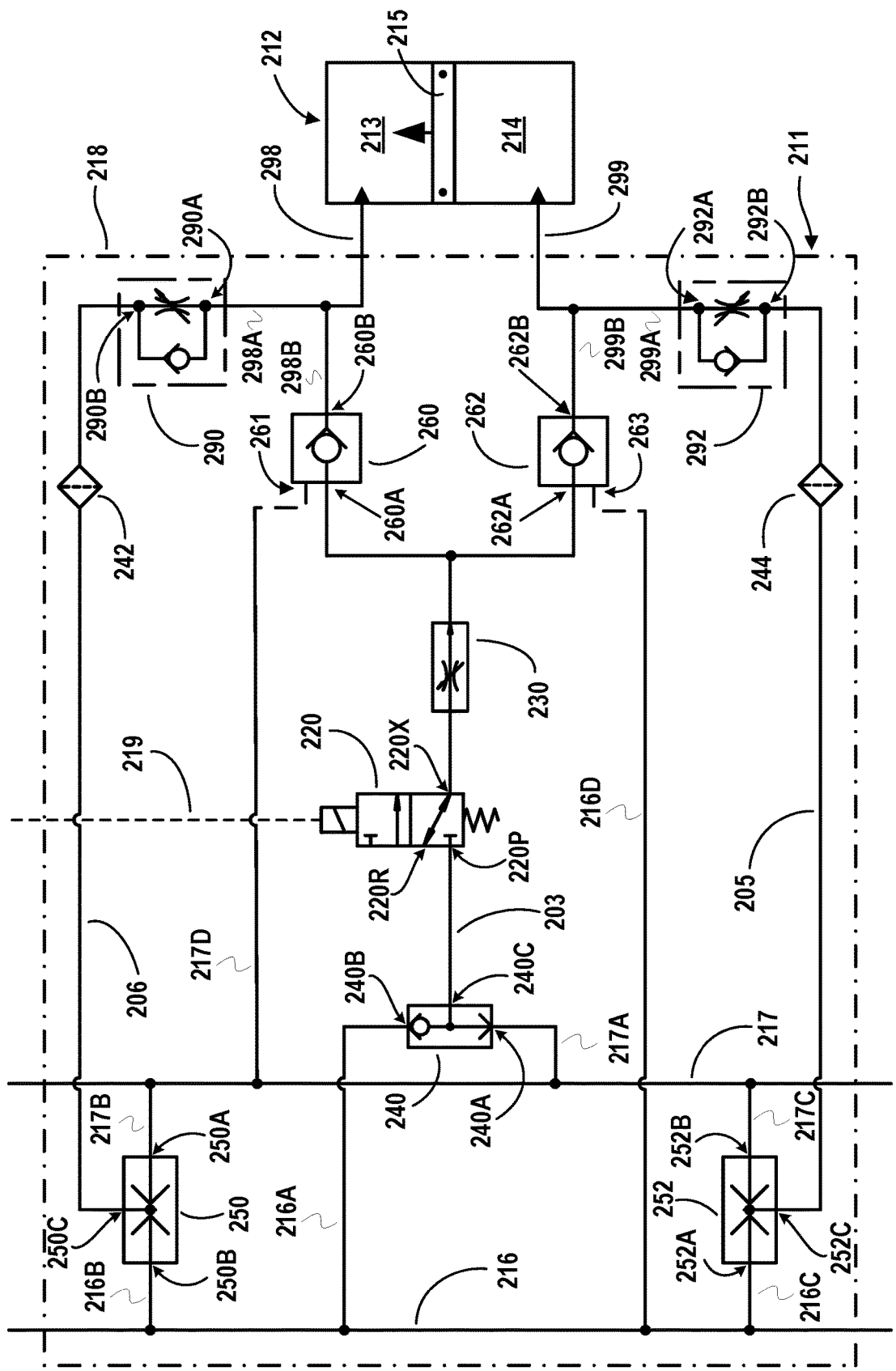
FIG. 2 depicts components of a control module of an electro-hydraulic circuit for actuating an ICV.

FIG. 2 depicts components of a control module of an electro-hydraulic circuit for actuating an ICV. The components and layout of the electro-hydraulic circuit will be described first and then followed by a description of operation of the electro-hydraulic circuit. A control module 211 includes a housing 218. The housing 218 can be coupled to tubing. The housing 218 protects the components of the control module 211. The components of the control module 211 include a normally closed (NC) solenoid valve (SOV) 220, a dynamic flow regulator/restrictor 230, a shuttle valve 240, an inverse shuttle valve 250, an inverse shuttle valve 252, a filter 242, a filter 244, a normally closed (NC) pilot check valve 260, a normally closed (NC) pilot check valve 262, a one-way restrictor 290, and a one-way restrictor 292. The components of the control module 211 are disposed within the housing 218.

A hydraulic line 216 and a hydraulic line 217 route through the control module 211. A "hydraulic line" as used herein refers to a hydraulic fluid conduit implemented as appropriate for the environment (e.g., a steel line or a hydraulic hose). FIG. 2 depicts the hydraulic lines 216, 217 entering and exiting the housing 218 via separate apertures. Embodiments may route the hydraulic lines 216, 217 through shared apertures. Each of the hydraulic lines 216, 217 branches within the housing 218. The hydraulic lines 216, 217 each branch to connect to different ports of a shuttle valve 240. Each of the hydraulic lines 216, 217 also branch to connect to different ports of inverse shuttle valves 250, 252. Each of the hydraulic lines 216, 217 also branch within the housing 218 to connect to NC pilot check valve 263, 260, respectively. For the branching of the hydraulic lines, embodiments can use a tee or a flow divider. The dynamic flow regulator(s) provides flow control to ensure that the hydraulic circuit conforms to an operating range of pressures even with branching/splitting with tees. An electrical power line 219 routes into the control module 211 through an aperture of the housing 218 to connect to the NC SOV 220.

The ICV 212 is divided into two sides, an open side 214 and a close side 213, by a double actuated floating piston 215. The movement of the double actuated floating piston 215 can control flow of fluid between the interior of a tubing string and an annulus. For example, movement of the double actuated floating piston 215 towards the close side 213 can increase flow between the interior of the tubing string and the annulus and movement of the double actuated floating piston 215 towards the open side 214 can reduce flow between the interior of the tubing and the annulus. The double actuated floating piston 215 of the ICV 212 can be fully closed, i.e., fully blocking flow between the interior of the tubing string and the annulus, or fully open allowing maximum flow between the interior of the tubing string and the annulus. The NC check valve 260 and one-way restrictor 290 are hydraulically coupled to the close side 213 with a hydraulic line 298 after joining of a hydraulic line 298A from the one-way restrictor 290 and a hydraulic line 298B from the B-port 260B. The NC check valve 262 and one-way restrictor 292 are hydraulically coupled with the open side 214 with a hydraulic line 299 after joining of a hydraulic line 299A from the one-way restrictor 292 and a hydraulic line 299B from the B-port 262B.

As depicted, the NC SOV 220 is a 2 position, 3-way NC SOV having a pressure port or P-port 220P, a return port or R-port 220R, and a control port or X-port 220X. The control port can also be referred to as a C-port. The NC SOV 220 has two states, an energized state and a deenergized state, corresponding to the two positions of the valve. In the deenergized state, the NC SOV 220 is in a first valve position, the closed position. In the closed position, hydraulic communication is allowed between the X-port 220X and the R-port 220R, and hydraulic communication is blocked between the P-port 220P and the X-port 220X. R-port 220R does not allow hydraulic communication thereto or therefrom, as it is not hydraulically coupled to another component. In the energized state, the NC SOV 220 is in a second valve position, the open position. In the open position hydraulic communication is allowed between the P-port 220P and the X-port 220X. The NC SOV 220 is controlled via the electrical power line 219 from a controller (not shown), and an electrical power source (not shown) to energize or deenergize the NC SOV 220. The controller and the electrical power source can be disposed on the surface or at a location remote from the well.

The shuttle valve 240 has three ports: A-port 240A, B-port 240B, and C-port 240C. The shuttle valve 240 includes internal components that allow hydraulic communication between the A-port 240A and C-port 240C when the pressure on A-port 240A is higher than the pressure on B-port 240B. When the pressure on B-port 240B is higher than pressure on A-port 240A, hydraulic communication is allowed between B-port 240B and C-port 240C. The hydraulic communication between the ports of the shuttle valve 240 can be unidirectional or bi-directional. A hydraulic branch 216A of the hydraulic line 216 connects to the B-port 240B. A hydraulic branch 217A of the hydraulic line 217 connects to the A-port 240B. A hydraulic line 203 connects the C-port 240C to the P-port 220P of the NC SOV 220.

The dynamic flow regulator 230 has an automatically adjustable variable-metering orifice. The dynamic flow regulator 230 is configured to provide a constant volumetric flow rate therethrough. The dynamic flow regulator 230 can sense the volumetric flow rate in terms of a differential pressure across a fixed orifice, and a variable metering orifice can then automatically adjust to keep the volumetric flow rate constant therethrough over a range of pressure differentials across the dynamic flow regulator 230. The dynamic flow regulator 230 can protect the NC SOV 220 and can also be used to provide bidirectional choke capability to the ICV 212.

Each of the inverse shuttle valves 250, 252 has three ports. Inverse shuttle valve 250 has an A-port 250A, a B-port 250B, and a C-port 250C. The inverse shuttle valve 252 has an A-port 252A, a B-port 252B, and a C-port 252C. Each inverse shuttle valve includes internal components that allow hydraulic communication either between the respective A-port and C-port when the pressure on the A-port is less than the pressure on the B-port, or between the respective B-port and C-port when the pressure on the B-port is less than the pressure on the A-port. The hydraulic communication between the ports of each inverse shuttle valve can be unidirectional or bi-directional. A hydraulic branch 216B of the hydraulic line 216 and hydraulic branch 217B of the hydraulic line 217 respectively connects to B-port 250B and A-port 250A of inverse shuttle valve 250. A hydraulic branch 216C of the hydraulic line 216 and hydraulic branch 217C of the hydraulic line 217 respectively connects to A-port 252A and B-port 252B of inverse shuttle valve 252.

Each of the NC pilot check valve 260, 262 has three ports. NC pilot check valve 260 has an A-port 260A, a B-port 260B, and a pilot port 261. NC pilot check valve 262 has an A-port 262A, a B-port 262B, and a pilot port 263. Each NC pilot check valve includes internal components that block hydraulic communication from the respective A-port to the respective B port. The NC pilot check valves 260, 261 are actuated to allow hydraulic communication from the A-port to the B-port when pressure is applied to the respective pilot port. A hydraulic branch 216D of the hydraulic line 216 connects to pilot port 263 of NC pilot check valve 262.

Hydraulic branch 217D of the hydraulic line 217 connects to pilot port 261 of NC pilot check valve 260. A-port 260A and A-port 262A are hydraulically coupled with the X-port 220X of the NC SOV 220 via the dynamic flow regulator 230. Each of the NC pilot check valves 260, 262 is disposed to block hydraulic communication from the X-port 220X to the ICV 212 until their respective pilot ports 261, 263 have pressure applied thereto.

The hydraulic lines 298, 298B connects the close side 213 of the ICV 212 with the B-port 260B of NC pilot check valve 260. The hydraulic lines 298, 298A connect the close side 213 with an A-port 290A of the one-way restrictor 290. A B-port 290B of one-way restrictor 290 is connected to the C-port 250C of the inverse shuttle valve 250 via hydraulic line 206. A filter 242 is disposed along hydraulic line 206. The one-way restrictor 290 is disposed to restrict pressure supplied to hydraulic line 206 from hydraulic line 298, but to allow pressure to be supplied to hydraulic line 298 from hydraulic line 206. In one or more embodiments, the first one-way restrictor 290 is replaced by a pilot to close (PTC) check valve. The hydraulic lines 299, 299B connect the open side 214 of the ICV 212 with the B-port 262B of NC pilot check valve 262. The hydraulic lines 299, 299A connect the open side 214 with an A-port 292A of the one-way restrictor 292. A B-port 292B of one-way restrictor 292 is connected to the C-port 252C of the inverse shuttle valve 252 via hydraulic line 205. A filter 244 is disposed along hydraulic line 205. One-way restrictor 292 is disposed to restrict pressure supplied to hydraulic line 205 from hydraulic line 299, but to allow pressure to be supplied to hydraulic line 299 from hydraulic line 205. Embodiments can replace the first one-way restrictor 292 with a pilot to close (PTC) check valve.

Example operation of the electro-hydraulic circuit is now described. The hydraulic line 216 and/or hydraulic line 217 are pressurized in combination with energizing or deenergizing the NC SOV 220, to open or close, at least partially, the ICV 212. A description for opening the ICV 212 is presented first and then followed by a description of closing the ICV 212.

To actuate the ICV 212 in an open direction, pressure on hydraulic line 216 is increased by a hydraulic power system. Once pressure on hydraulic line 216 is greater than pressure on hydraulic line 217, the shuttle valve 240 is activated via the hydraulic branch 216A of the hydraulic line 216 to allow hydraulic communication between the B-port 240B and the C-port 240C, such that pressure is supplied to hydraulic line 203. The higher pressure from hydraulic line 216 on B-port 250B of inverse shuttle valve 250 via hydraulic branch 216B will allow hydraulic communication between C-port 250C and A-port 250A. Likewise, the higher pressure from hydraulic line 216 on A-port 252A of inverse shuttle valve 252 via hydraulic branch 216C will allow hydraulic communication between B-port 252B and C-port 252C.

When the NC SOV 220 is in its deenergized state, hydraulic communication is blocked between X-port 220X and the P-port 220P of the NC SOV 220, such that pressure cannot be supplied to the dynamic flow regulator 230. When the NC SOV 220 is energized, the NC SOV 220 moves from the closed position to the open position to allow hydraulic communication between the P-port 220P and the X-port 220X, such that pressure is equalized between hydraulic line 203 and dynamic flow regulator 230. The variable metering orifice of the dynamic flow regulator 230 automatically adjusts to maintain a constant differential pressure across the dynamic flow regulator 230. With pressure on hydraulic line 216, NC pilot check valve 262 will be activated to open by pilot port 263 due to the pressure on hydraulic branch 216D and allow hydraulic communication between A-port 262A and B-port 262B. NC pilot check valve 260 will remain closed because the pressure on hydraulic line 216 is greater than the pressure on hydraulic line 217. Pressure will then equalize across NC pilot valve 262, hydraulic lines 299, 299B and open side 214 of the ICV 212 based on the pressure output from the dynamic flow regulator 230.

The pressure of the open side 214 via the NC pilot check valve 262 and the hydraulic lines 299, 299B creates a differential pressure across the double actuated floating piston 215, such that the double actuated floating piston 215 moves towards close side 213 and the pressure of close side 213 increases. The pressure of close side 213 is equalized with hydraulic line 298. The pressure in the close side 213 and hydraulic line 298 will be relieved through one-way restrictor 290 and filter 242 to hydraulic branch 206. With C-port 250C and A-port 250A being allowed to hydraulically communicate (due to pressure on hydraulic branch 216B of the hydraulic line 216 being greater than the pressure on hydraulic branch 217B of the hydraulic line 217), the pressure from hydraulic line 206 is then relieved to hydraulic line 217 via the hydraulic branch 217B. There will be pressure lost from hydraulic lines 299, 299A to hydraulic line 205 via one-way restrictor 292, but this will be limited due to the resistance provided by one-way restrictor 292. The amount of pressure lost through one-way restrictor 292 corresponds to the pressure differential across one-way restrictor 290, due to the restriction in one-way restrictor 290. The ICV 212 will continue to open until either the NC SOV 220 is deenergized or the ICV 212 reaches a fully open state. Deenergizing the NC SOV 220 while pressure on hydraulic line 216 is greater than pressure on hydraulic line 217 will block pressure supply to ICV 212, thereby allowing the pressure differential across the double actuated floating piston to equalize, resulting in the ICV 212 ceasing to open.

To actuate the ICV 212 in a close direction, pressure on hydraulic line 217 is increased, by a hydraulic power system 113. Once pressure on hydraulic line 217 is greater than pressure on hydraulic line 216, shuttle valve 240 is activated via the hydraulic branch 217A of the hydraulic line 217 to allow hydraulic communication between the A-port 240A and the C-port 240C, such that pressure is supplied to hydraulic line 203. The higher pressure from hydraulic line 217 on A-port 250A of inverse shuttle valve 250 via hydraulic branch 217B will allow hydraulic communication between C-port 250C and B-port 250B. Likewise, higher pressure from hydraulic line 217 on B-port 252B of inverse shuttle valve 252 via hydraulic branch 217C will allow hydraulic communication between C-port 252C and A-port 252A.

When the NC SOV 220 is in its deenergized state, hydraulic communication is blocked between the X-port 220X and the P-port 220P, such that pressure cannot be supplied to the dynamic flow regulator 230. When the NC SOV 220 is energized, the NC SOV 220 moves from the closed position to the open position to allow hydraulic communication between the P-port 220P to the X-port 220X, such that pressure is equalized between hydraulic line 203 and dynamic flow regulator 230. The variable metering orifice of the dynamic flow regulator 230 automatically adjusts to maintain a constant differential pressure across the dynamic flow regulator 230. With pressure on hydraulic line 217, NC pilot check valve 260 will be activated open by pilot port 261 due to the pressure on hydraulic branch 217D and allow hydraulic communication between A-port 260A and B-port 260B. NC pilot check valve 262 will remain closed because the pressure on hydraulic line 217 conveyed to the A-port 262A is greater than the pressure on hydraulic line 216 conveyed to the pilot 263. Pressure will then equalize across NC pilot valve 260, hydraulic lines 298, 298B and close side 213 of the ICV 212 based on the pressure output from the dynamic flow regulator 230.

The pressure of the close side 213 creates a differential pressure across the double actuated floating piston 215, such that the double actuated floating piston 215 moves towards the open side 214 and the pressure of the open side 214 increases. The pressure of open side 214 is equalized with hydraulic line 299. The pressure in the open side 214 and hydraulic line 299 will be relieved through one-way restrictor 292 and filter 244 to hydraulic branch 205. With C-port 252C and A-port 252A being allowed to hydraulically communicate (due to pressure on hydraulic branch 217C of the hydraulic line 217 being greater than pressure on hydraulic branch 216C of the hydraulic line 216), the pressure from hydraulic line 205 is then relieved to hydraulic line 216 via hydraulic branch 216C. There will be pressure lost from hydraulic line 298 to hydraulic line 206 via one-way restrictor 290, but this will be limited due to the resistance provided by the one-way restrictor 290. The amount of pressure lost through one-way restrictor 290 corresponds to the pressure differential across one-way restrictor 292, due to the restriction in one-way restrictor 292. The ICV 212 will continue to close until either the NC SOV 220 is deenergized or the ICV 212 reaches a fully closed state. Deenergizing the NC SOV 220 while pressure on hydraulic line 217 is greater than pressure on hydraulic line 216 will block pressure supply to ICV 212, thereby allowing the pressure differential across the double actuated floating piston to equalize, resulting in the ICV 212 ceasing to close.

Figure 3:
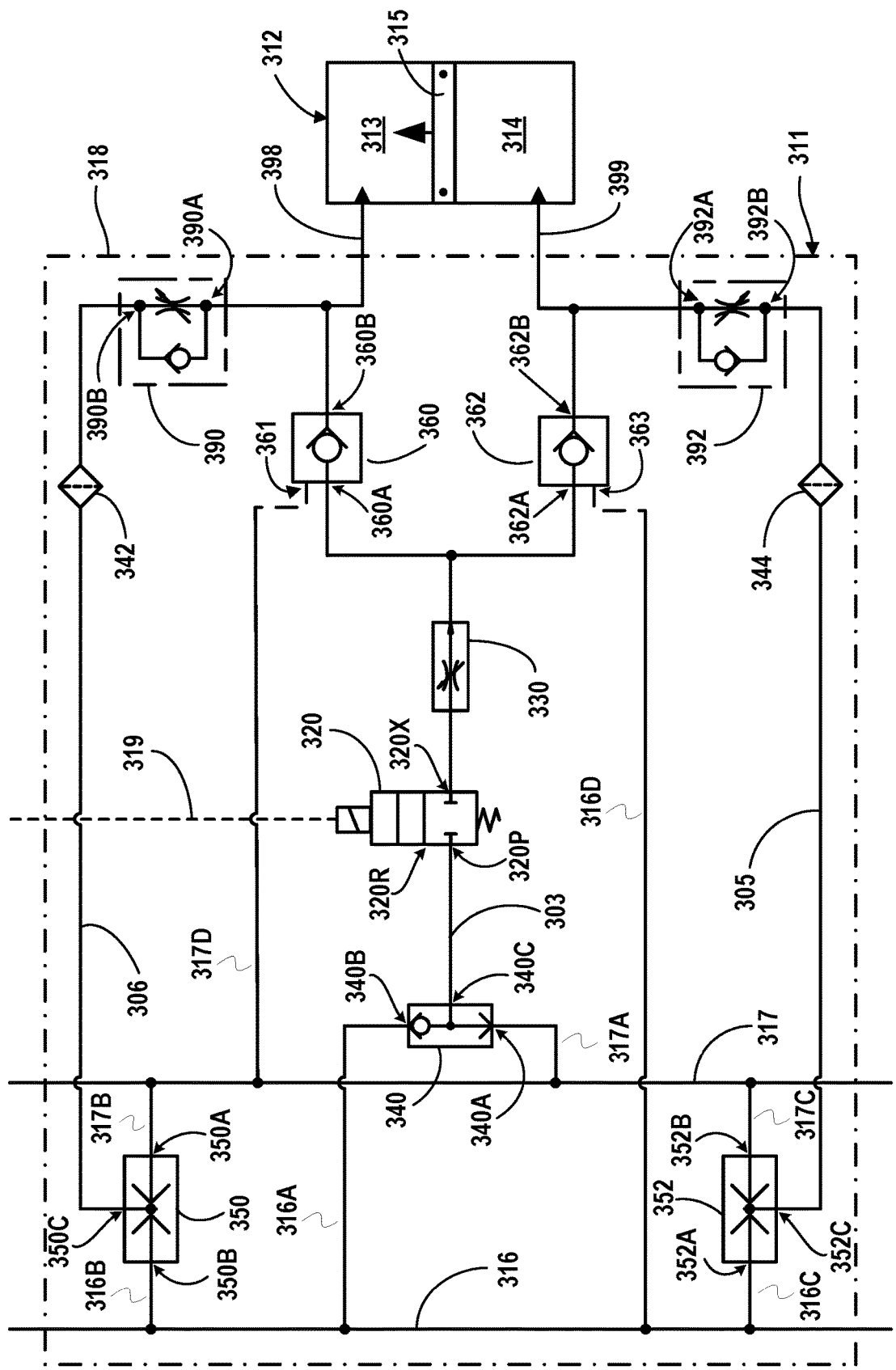
FIG. 3 depicts components of a control module of an electro-hydraulic circuit for actuating an ICV.

FIG. 3 depicts components of a control module of an electro-hydraulic circuit for actuating an ICV. A control module 311 is coupled to an ICV 312. The control module 311 includes housing 318 that can be coupled to tubing (e.g., to the completion sub 110 or the tubing string 104). The housing 318 protects the components of the control module 311. Hydraulic line 316 and hydraulic line 317 route into or through the control module 311, depending on how the control module 311 is deployed. In addition, an electric line 319 enters the housing 318 to supply energy to a NC SOV 320. The ICV 312 is hydraulically coupled to the control module 311 via hydraulic line 398 and hydraulic line 399.

The control module 311 is similar to the control module 211 in FIG. 2. The control module 311 includes a dynamic flow regulator 330, a shuttle valve 340, filter 342, filter 344, inverse shuttle valve 350, inverse shuttle valve 352, NC pilot check valve 360, NC pilot check valve 362, one-way restrictor 390, and one-way restrictor 392. Similar to FIG. 2, embodiments can replace one or both of one-way restrictor 390 and one-way restrictor 392 with a PTC check valve(s). However, instead of a 3-way NC SOV, the second hydraulic circuit 300 has 2-way NC SOV 320, i.e., having only two ports, a pressure port or P-port 320P and a control port or X-port 320X. The P-port 320 is coupled to C-port 340C of the shuttle valve 340 and the X-port 320X is coupled to NC pilot check valve 360 and NC pilot check valve 362 via the dynamic flow regulator 330. Each of the NC pilot check valves 360, 362 is disposed to block hydraulic communication from the X-port 320X to ICV 312 until their respective pilot ports 361, 363 have pressure applied thereto. As the R-port 220R in the 3-way NC SOV 220 in hydraulic circuit 200 is not utilized, actuating the ICV 312 with the control module 311 to open and close the ICV 312 is done in the same manner with the 2-way NC SOV 320.

Figure 4:
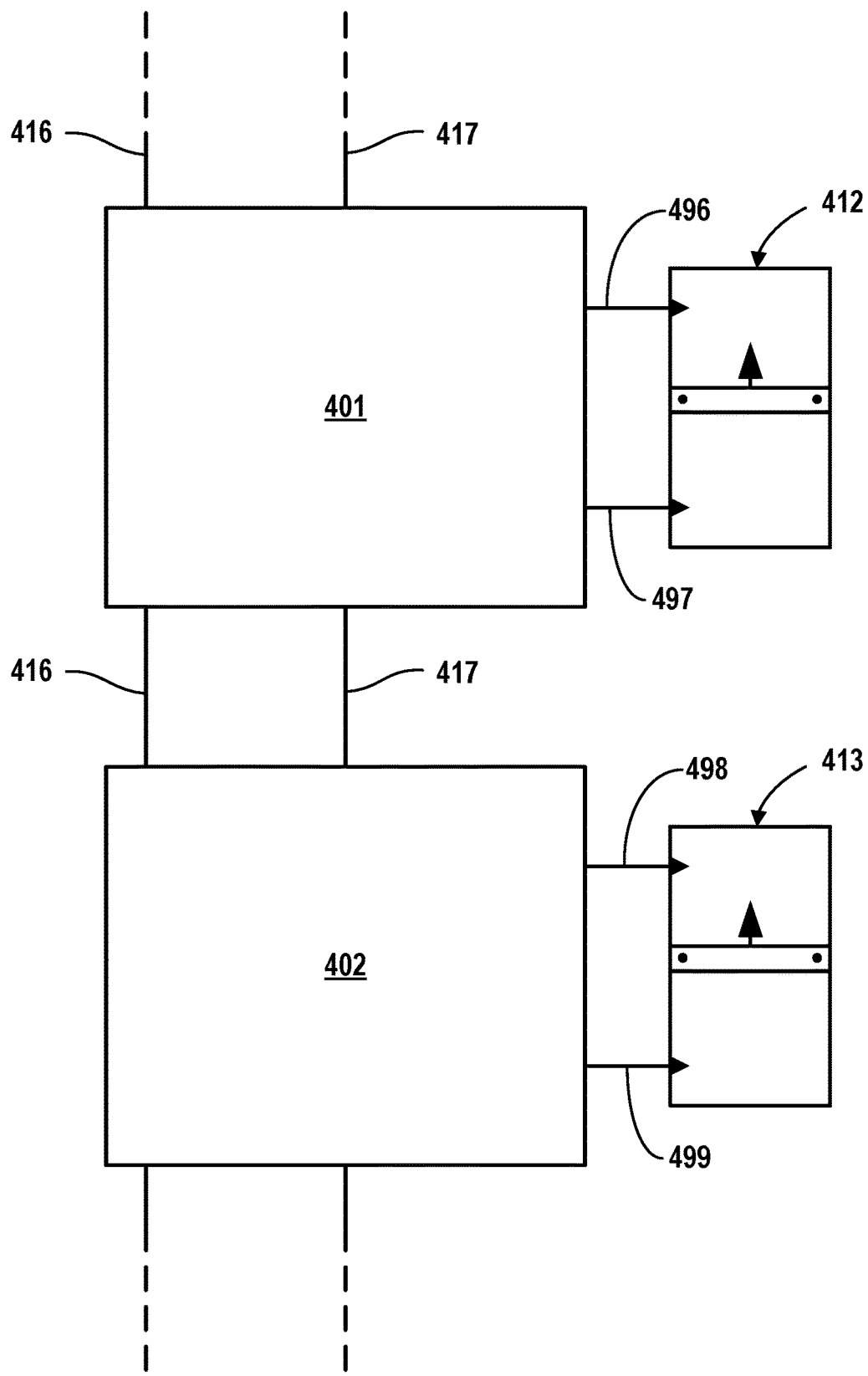
FIG. 4 depicts a plurality of electro-hydraulic control modules in a stacked configuration.

FIG. 4 depicts a plurality of electro-hydraulic control modules in a stacked configuration. Two control modules are shown: control module 401 and control module 402. Each of the control modules 401, 402 can be similar to the control module 211 of FIG. 2, the control module 311 of FIG. 3, or to a different one of the control modules 211, 311. The control modules 401, 402 are hydraulically connected to ICV 412, ICV 413, respectively. The control module 401 is connected to the ICV 412 by hydraulic lines 496, 497. The control module 402 is connected to the ICV 413 by hydraulic lines 498, 499. The control modules 401, 402 are said to be "stacked" because the same hydraulic lines (hydraulic line 416 and hydraulic line 417) are used to charge more than one control module. The hydraulic line 416 and hydraulic line 417 can use a tee to branch to the control 401, 402. A dynamic flow regulator can be placed on hydraulic line 416 and/or hydraulic line 417 above and/or between control modules to provide flow control to facilitate conformance with an operating pressure range of the control modules. The placement of the dynamic flow regulator above and/or between control modules on hydraulic line 416 and/or hydraulic line 417 may depend on a variety of factors including the distance between control modules, the depth of a control module, and the pressure exerted on a control module by a hydraulic power system.

For a stacked configuration, individual control of NC SOVs allows individual actuation of ICVs via the electro-hydraulic circuits with the shared hydraulic lines. With pressure of one hydraulic line greater than the other hydraulic line, NC SOVs in each of the control modules 401, 402 can be energized or deenergized to change state of a corresponding ICV. For example, with pressure on hydraulic line 416 greater than pressure on hydraulic line 417, an NC SOV (e.g., NC SOV 220) in control module 401 can be energized to open ICV 412, an NC SOV in control module 402 can be energized to open ICV 413, or both can occur simultaneously. In another example, with pressure on hydraulic line 417 greater than pressure on hydraulic line 416, an NC SOV in control module 401 can be energized to close ICV 412, a NC SOV in control module 402 can be energized to close ICV 413, or both can occur simultaneously. In one or more embodiments, a circuit disposed downhole, e.g., a multiplexer or the like, can be used to separately address the NC SOVs of the stacked control modules, e.g., via the electric line 219. Thus, stacking the control modules allows the system to use two hydraulic lines for control of a plurality of ICVs. Stacking also allows the use of only one electric line to the surface, e.g., via TEC. In a single control module configuration, the hydraulic lines terminate within or proximate to the control module. In the stacked configuration, the hydraulic lines terminate within or proximate to the "last" or "stack termination" control module (i.e., the last control module in the series).

Variations

While the aspects of the disclosure are described with reference to various implementations and exploitations, it will be understood that these aspects are illustrative. In general, techniques for opening and closing ICVs as described herein may be implemented with facilities consistent with any hardware system or hardware systems. Many variations, modifications, additions, and improvements are possible. For instance, some embodiments may split the components of the disclosed electro-hydraulic controller into different housings. This may be done to satisfy space constraints. When components of the electro-hydraulic controller are disposed within different housings, a tee block or a flow divider is used for branching of hydraulic lines into the different housings. In addition, embodiments are not limited to placement of the dynamic flow regulator as disclosed herein. While the disclosed illustrations are based on a preference to place the dynamic flow regulator proximate to the ICV actuated by the electro-hydraulic controller, embodiments can place the dynamic flow regulator anywhere on a hydraulic line among the components that form an electro-hydraulic controller. In embodiments with components disposed within different housings, a dynamic flow regulator may be disposed within each housing or fewer than all of the housings.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Unless otherwise specified, use of the terms "connect," "engage," "couple," "attach," or any other like term describing an interaction between elements is not meant to limit the interaction to direct interaction between the elements and may also include indirect interaction between the elements described. Unless otherwise specified, use of the terms "up," "upper," "upward," "up-hole," "upstream," or other like terms shall be construed as generally from the formation toward the surface, or toward the surface of a body of water; likewise, use of "down," "lower," "downward," "downhole," "downstream," or other like terms shall be construed as generally into the formation away from the surface or away from the surface of a body of water, regardless of the wellbore orientation. Use of any one or more of the foregoing terms shall not be construed as denoting positions along a perfectly vertical axis. Unless otherwise specified, use of the term "subterranean formation" shall be construed as encompassing both areas below exposed earth and areas below earth covered by water such as ocean or fresh water.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Embodiment 1: A system comprising: tubing; an interval control valve (ICV) coupled to the tubing, the ICV having an open side and a close side; a first hydraulic line and a second hydraulic line that are coupled with a hydraulic power system; a first electrical power line coupled with a power source; a set of one or more housings that enclose, a normally closed (NC) solenoid valve (SOV) that is coupled with the first electric power line; a shuttle valve coupled with the first and the second hydraulic lines and hydraulically coupled with the NC SOV; a dynamic flow regulator that is hydraulically coupled between the NC SOV and first and second normally closed (NC) pilot check valves; the first NC pilot check valve coupled with the second hydraulic line and hydraulically coupled with the close side of the ICV and a first one-way restrictor; the second NC pilot check valve coupled with the first hydraulic line and hydraulically coupled with the open side of the ICV and a second one-way restrictor; a first inverse shuttle valve coupled with the first and second hydraulic lines and hydraulically coupled with the first one-way restrictor; and a second inverse shuttle valve coupled with the first and second hydraulic lines and hydraulically coupled with the second one-way restrictor.

Embodiment 2: The system of Embodiment 1, wherein the first hydraulic line is coupled with a B-port of the shuttle valve, a B-port of the first inverse shuttle valve, an A-port of the second inverse shuttle valve, and a pilot port of the second NC pilot check valve, and wherein the second hydraulic line is coupled with an A-port of the shuttle valve, an A-port of the first inverse shuttle valve, a B-port of the second inverse shuttle valve, and a pilot port of the first NC pilot check valve.

Embodiment 3: The system of Embodiment 1, wherein a C-port of the shuttle valve is hydraulically coupled with a P-port of the NC SOV, and an X-port of the NC SOV is hydraulically coupled with the dynamic flow regulator.

Embodiment 4: The system of Embodiment 1, wherein the dynamic flow regulator is configured to maintain a constant differential pressure across the dynamic flow regulator, and wherein the dynamic flow regulator comprises an automatically adjustable variable-metering orifice.

Embodiment 5: The system of Embodiment 4, wherein the dynamic flow regulator is hydraulically coupled with an A-port of the first NC pilot check valve and with an A-port of the second NC pilot check valve.

Embodiment 6: The system of Embodiment 1, wherein the first NC pilot check valve being hydraulically coupled with the close side of the ICV and the first one-way restrictor comprises a plurality of hydraulic lines coupling a B-port of the first NC pilot check valve and an A-port of the first one-way restrictor with the close side of the ICV.

Embodiment 7: The system of Embodiment 6 further comprising a filter hydraulically coupled between a B-port of the first one-way restrictor and a C-port of the first inverse shuttle valve.

Embodiment 8: The system of Embodiment 1, wherein the second NC pilot check valve being hydraulically coupled with the open side of the ICV and with a second one-way restrictor comprises a plurality of hydraulic lines coupling a B-port of the second NC pilot check valve and an A-port of the second one-way restrictor with the open side of the ICV.

Embodiment 9: The system of Embodiment 8 further comprising a filter hydraulically coupled between a B-port of the second one-way restrictor and a C-port of the second inverse shuttle valve.

Embodiment 10: An apparatus comprising: a first hydraulic conduit and a second hydraulic conduit; a shuttle valve coupled with the first and second hydraulic conduits and hydraulically coupled with a normally closed (NC) solenoid valve (SOV); a dynamic flow regulator that is hydraulically coupled with the NC SOV and with a first and a second normally closed (NC) pilot check valves; the first NC pilot check valve coupled with the second hydraulic conduit and adapted to hydraulically couple with a control valve external to the apparatus; the second NC pilot check valve coupled with the first hydraulic conduit and adapted to hydraulically couple with a control valve external to the apparatus; a first one-way restrictor that is hydraulically coupled with a first inverse shuttle valve, the first NC pilot check valve, and adapted to hydraulically couple with a control valve external to the apparatus; a second one-way restrictor that is hydraulically coupled with a second inverse shuttle valve, the second NC pilot check valve, and adapted to hydraulically couple with a control valve external to the apparatus; the first inverse shuttle valve that is coupled with the first and second hydraulic conduits; and the second inverse shuttle valve that is coupled with the first and second hydraulic conduits.

Embodiment 11: The apparatus of Embodiment 10, wherein the dynamic flow regulator being hydraulically coupled with the NC SOV and the first and second NC pilot check valves comprises a first port of the dynamic flow regulator being coupled with an A port of the first NC pilot check valve and with an A-port of the second NC pilot check valve and a second port of the dynamic flow regulator being hydraulically coupled with an X-port of the NC SOV.

Embodiment 12: The apparatus of Embodiment 10, wherein the first hydraulic conduit is coupled with a B-port of the shuttle valve, the second hydraulic conduit is coupled with an A-port of the shuttle valve, and wherein a C-port of the shuttle valve is hydraulically coupled with a P-port of the NC SOV.

Embodiment 13: The apparatus of Embodiment 10, wherein the first one-way restrictor being hydraulically coupled with the first inverse shuttle valve and the first NC pilot check valve comprises a B-port of the first NC pilot check valve being hydraulically coupled with an A-port of the first one-way restrictor, and wherein the second one-way restrictor being hydraulically coupled with the second inverse shuttle valve and the second NC pilot check valve comprises a B-port of the second NC pilot check valve being hydraulically coupled with an A-port of the second one-way restrictor.

Embodiment 14: The apparatus of Embodiment 10 further comprising a first filter hydraulically coupled between a B-port of the first one-way restrictor and a C-port of the first inverse shuttle valve.

Embodiment 15: The apparatus of Embodiment 10 further comprising a second filter hydraulically coupled between a B-port of the second one-way restrictor and a C-port of the second inverse shuttle valve.

Embodiment 16: The apparatus of Embodiment 10 further comprising a housing having apertures to route the first and second hydraulic conduits.

Embodiment 17: The apparatus of Embodiment 10, wherein the first one-way restrictor is disposed to restrict flow traveling from the A-port of the first one-way restrictor to the B-port of the first one-way restrictor and to allow flow from B-port of the first one-way restrictor to the A-port of the first one-way restrictor, and wherein the second one-way restrictor is disposed to restrict flow traveling from the A-port of the first one-way restrictor to the B-port of the first one-way restrictor and to allow flow from B-port of the first one-way restrictor to the A-port of the first one-way restrictor.

Embodiment 18: A system comprising: tubing; a plurality of interval control valves (ICVs) coupled to the tubing, each of the plurality of ICVs having an open side and a close side; a first hydraulic line and a second hydraulic line that are coupled with a hydraulic power system; a first electrical power line coupled with an electrical power source; a plurality of electro-hydraulic controllers coupled to control the plurality of ICVs, wherein each of the plurality of electro-hydraulic controllers comprises, a normally closed (NC) solenoid valve (SOV) that is coupled with the first electrical power line; a shuttle valve coupled with the first and the second hydraulic lines and hydraulically coupled with the NC SOV; a dynamic flow regulator that is hydraulically coupled between the NC SOV and first and second normally closed (NC) pilot check valves; the first NC pilot check valve coupled with the second hydraulic line and hydraulically coupled with the close side of a respective one of the plurality of ICVs and with a first one-way restrictor; the second NC pilot check valve coupled with the first hydraulic line and hydraulically coupled with the open side of a respective one of the plurality of ICVs and with a second one-way restrictor; a first inverse shuttle valve coupled with the first and second hydraulic lines and hydraulically coupled with the first one-way restrictor; and a second inverse shuttle valve coupled with the first and second hydraulic lines and hydraulically coupled with the second one-way restrictor.

Embodiment 19: The system of Embodiment 18, wherein the NC SOV of at least a first of the electro-hydraulic controllers is one of a 2-way NC SOV and 3-way NC SOV.

Embodiment 20: The system of Embodiment 18 further comprising a set of one or more multiplexers coupled with the first electrical power line, wherein the first electrical power line and the set of one or more multiplexers are adapted to independently address at least a subset of the NC SOVs.

The invention claimed is:

1. A system comprising:
   tubing;
   an interval control valve (ICV) coupled to the tubing, the ICV having an open side and a close side;
   a first hydraulic line and a second hydraulic line that are coupled with a hydraulic power system;
   a first electrical power line coupled with a power source;
   a set of one or more housings that enclose,
      a normally closed (NC) solenoid valve (SOV) that is coupled with the first electric power line;
      a shuttle valve coupled with the first and the second hydraulic lines and hydraulically coupled with the NC SOV;
      a dynamic flow regulator that is hydraulically coupled between the NC SOV and first and second normally closed (NC) pilot check valves;
      the first NC pilot check valve coupled with the second hydraulic line and hydraulically coupled with the close side of the ICV and a first one-way restrictor;
      the second NC pilot check valve coupled with the first hydraulic line and hydraulically coupled with the open side of the ICV and a second one-way restrictor;
      a first inverse shuttle valve coupled with the first and second hydraulic lines and hydraulically coupled with the first one-way restrictor; and
      a second inverse shuttle valve coupled with the first and second hydraulic lines and hydraulically coupled with the second one-way restrictor.

2. The system of claim 1, wherein the first hydraulic line is coupled with a B-port of the shuttle valve, a B-port of the first inverse shuttle valve, an A-port of the second inverse shuttle valve, and a pilot port of the second NC pilot check valve, and wherein the second hydraulic line is coupled with an A-port of the shuttle valve, an A-port of the first inverse shuttle valve, a B-port of the second inverse shuttle valve, and a pilot port of the first NC pilot check valve.

3. The system of claim 1, wherein a C-port of the shuttle valve is hydraulically coupled with a P-port of the NC SOV, and an X-port of the NC SOV is hydraulically coupled with the dynamic flow regulator.

4. The system of claim 1, wherein the dynamic flow regulator is configured to maintain a constant differential pressure across the dynamic flow regulator, and wherein the dynamic flow regulator comprises an automatically adjustable variable-metering orifice.

5. The system of claim 4, wherein the dynamic flow regulator is hydraulically coupled with an A-port of the first NC pilot check valve and with an A-port of the second NC pilot check valve.

6. The system of claim 1, wherein the first NC pilot check valve being hydraulically coupled with the close side of the ICV and the first one-way restrictor comprises a plurality of hydraulic lines coupling a B-port of the first NC pilot check valve and an A-port of the first one-way restrictor with the close side of the ICV.

7. The system of claim 6 further comprising a filter hydraulically coupled between a B-port of the first one-way restrictor and a C-port of the first inverse shuttle valve.

8. The system of claim 1, wherein the second NC pilot check valve being hydraulically coupled with the open side of the ICV and with a second one-way restrictor comprises a plurality of hydraulic lines coupling a B-port of the second NC pilot check valve and an A-port of the second one-way restrictor with the open side of the ICV.

9. The system of claim 8 further comprising a filter hydraulically coupled between a B-port of the second one-way restrictor and a C-port of the second inverse shuttle valve.

10. An apparatus comprising:
a first hydraulic conduit and a second hydraulic conduit;
a shuttle valve coupled with the first and second hydraulic conduits and hydraulically coupled with a normally closed (NC) solenoid valve (SOV);
a dynamic flow regulator that is hydraulically coupled with the NC SOV and with a first and a second normally closed (NC) pilot check valves;
the first NC pilot check valve coupled with the second hydraulic conduit and adapted to hydraulically couple with a control valve external to the apparatus;
the second NC pilot check valve coupled with the first hydraulic conduit and adapted to hydraulically couple with a control valve external to the apparatus;
a first one-way restrictor that is hydraulically coupled with a first inverse shuttle valve, the first NC pilot check valve, and adapted to hydraulically couple with a control valve external to the apparatus;
a second one-way restrictor that is hydraulically coupled with a second inverse shuttle valve, the second NC pilot check valve, and adapted to hydraulically couple with a control valve external to the apparatus;
the first inverse shuttle valve that is coupled with the first and second hydraulic conduits; and
the second inverse shuttle valve that is coupled with the first and second hydraulic conduits.

11. The apparatus of claim 10, wherein the dynamic flow regulator being hydraulically coupled with the NC SOV and the first and second NC pilot check valves comprises a first port of the dynamic flow regulator being coupled with an A port of the first NC pilot check valve and with an A-port of the second NC pilot check valve and a second port of the dynamic flow regulator being hydraulically coupled with an X-port of the NC SOV.

12. The apparatus of claim 10, wherein the first hydraulic conduit is coupled with a B-port of the shuttle valve, the second hydraulic conduit is coupled with an A-port of the shuttle valve, and wherein a C-port of the shuttle valve is hydraulically coupled with a P-port of the NC SOV.

13. The apparatus of claim 10, wherein the first one-way restrictor being hydraulically coupled with the first inverse shuttle valve and the first NC pilot check valve comprises a B-port of the first NC pilot check valve being hydraulically coupled with an A-port of the first one-way restrictor, and wherein the second one-way restrictor being hydraulically coupled with the second inverse shuttle valve and the second NC pilot check valve comprises a B-port of the second NC pilot check valve being hydraulically coupled with an A-port of the second one-way restrictor.

14. The apparatus of claim 13, wherein the first one-way restrictor is disposed to restrict flow traveling from the A-port of the first one-way restrictor to the B-port of the first one-way restrictor and to allow flow from the B-port of the first one-way restrictor to the A-port of the first one-way restrictor, and wherein the second one-way restrictor is disposed to restrict flow traveling from the A-port of the first one-way restrictor to the B-port of the first one-way restrictor and to allow flow from the B-port of the first one-way restrictor to the A-port of the first one-way restrictor.

15. The apparatus of claim 10, further comprising a first filter hydraulically coupled between a B-port of the first one-way restrictor and a C-port of the first inverse shuttle valve.

16. The apparatus of claim 10, further comprising a second filter hydraulically coupled between a B-port of the second one-way restrictor and a C-port of the second inverse shuttle valve.

17. The apparatus of claim 10 further comprising a housing having apertures to route the first and second hydraulic conduits.

18. A system comprising:
tubing;
a plurality of interval control valves (ICVs) coupled to the tubing, each of the plurality of ICVs having an open side and a close side;
a first hydraulic line and a second hydraulic line that are coupled with a hydraulic power system;
a first electrical power line coupled with an electrical power source;
a plurality of electro-hydraulic controllers coupled to control the plurality of ICVs, wherein each of the plurality of electro-hydraulic controllers comprises,
a normally closed (NC) solenoid valve (SOV) that is coupled with the first electrical power line;
a shuttle valve coupled with the first and the second hydraulic lines and hydraulically coupled with the NC SOV;
a dynamic flow regulator that is hydraulically coupled between the NC SOV and first and second normally closed (NC) pilot check valves;
the first NC pilot check valve coupled with the second hydraulic line and hydraulically coupled with the close side of a respective one of the plurality of ICVs and with a first one-way restrictor;
the second NC pilot check valve coupled with the first hydraulic line and hydraulically coupled with the open side of a respective one of the plurality of ICVs and with a second one-way restrictor;
a first inverse shuttle valve coupled with the first and second hydraulic lines and hydraulically coupled with the first one-way restrictor; and
a second inverse shuttle valve coupled with the first and second hydraulic lines and hydraulically coupled with the second one-way restrictor.

19. The system of claim 18, wherein the NC SOV of at least a first of the electro-hydraulic controllers is one of a 2-way NC SOV and 3-way NC SOV.

20. The system of claim 18, further comprising a set of one or more multiplexers coupled with the first electrical power line, wherein the first electrical power line and the set of one or more multiplexers are adapted to independently address at least a subset of the NC SOVs.

* * * * *